US012629882B2

(12) United States Patent
Guo et al.

(10) Patent No.: US 12,629,882 B2
(45) Date of Patent: May 19, 2026

(54) NEGATIVE MOLD FOR LUGGAGE MOLDING AND APPLICATION THEREOF

(71) Applicant: CHUZHOU YUJIAN TRAVEL PRODUCT CO., LTD., Chuzhou City (CN)

(72) Inventors: Changjun Guo, Chuzhou City (CN); Changyong Huang, Chuzhou City (CN)

(73) Assignee: CHUZHOU YUJIAN TRAVEL PRODUCT CO., LTD., Chuzhou City (CN)

( * ) Notice: Subject to any disclaimer, the term of this patent is extended or adjusted under 35 U.S.C. 154(b) by 46 days.

(21) Appl. No.: 18/354,831

(22) Filed: Jul. 19, 2023

(65) Prior Publication Data

US 2024/0416573 A1    Dec. 19, 2024

(51) Int. Cl.
*B29C 51/30*        (2006.01)
*B29C 51/08*        (2006.01)
*B29C 51/10*        (2006.01)
*B29L 31/00*        (2006.01)

(52) U.S. Cl.
CPC ............ B29C 51/30 (2013.01); B29C 51/082 (2013.01); B29C 51/10 (2013.01); *B29L 2031/7418* (2013.01)

(58) Field of Classification Search
CPC ........ B29C 51/30; B29C 51/082; B29C 51/10
See application file for complete search history.

(56) References Cited

U.S. PATENT DOCUMENTS

| | | | | |
|---|---|---|---|---|
| 2,973,558 | A | * | 3/1961 | Stratton, Jr. ............ B29C 51/04 264/549 |
| 3,933,562 | A | * | 1/1976 | Cruckshank ............ B29C 51/04 156/286 |
| 5,441,675 | A | * | 8/1995 | Souders .............. B29C 33/3814 264/402 |
| 2008/0216953 | A1 | * | 9/2008 | Tirlemont .......... B29C 45/1418 425/112 |
| 2016/0297126 | A1 | * | 10/2016 | Hiraishi ............ B29C 45/14688 |

FOREIGN PATENT DOCUMENTS

| | | | |
|---|---|---|---|
| DE | 102018008725 | * | 3/2020 |
| DE | 102021124720 | * | 3/2020 |
| EP | 1894695 | * | 3/2008 |
| WO | WO03/033353 | * | 4/2003 |

* cited by examiner

*Primary Examiner* — Edmund H Lee

(57)        ABSTRACT

The present disclosure provides a negative mold for luggage molding and an application thereof. The negative mold includes an upper mold holder (11), a convex mold (12), a lower mold holder (21), a concave mold (22), a lifting platform (23), and a material frame (31). The upper mold holder is arranged with a first airflow channel (111); in the adsorbed state, the upper mold holder abuts against the material frame to define an upper air cavity (112); air is blown downward through the first airflow channel to stretch the sheet (41), while each of the convex mold and the concave mold moves in a direction close to the sheet to define a molding space; in the mold detaching state, each of the convex mold and the concave mold moves toward in another direction away from the material frame to detach the molded sheet.

6 Claims, 6 Drawing Sheets

411 412

611

NEGATIVE MOLD FOR LUGGAGE MOLDING AND APPLICATION THEREOF

TECHNICAL FIELD

The present disclosure relates to the technical field of blister molds, and in particular to a negative mold for luggage molding and an application thereof.

BACKGROUND

The process of blister molding roughly includes sheet cutting, sheet fixing, heating, molding, demolding, and de-materializing. Among them, molding is a crucial part, in which the heated sheet is adsorbed on the mold by vacuum adsorption, and the molding is completed after cooling. An existing luggage molding process generally adopts the positive-mold blister molding. In the positive-mold blister molding, the appearance surface of the luggage housing is on the other side opposite to the molding surface of the mold, also with the thickness of the sheet, such that the positive-mold blister molding process is prone to indistinguishable problems of the lines, angles, etc. of the appearance surface. In addition, during the positive-mold blister molding, the grains and patterns, etc. on the luggage housing need to be set on the sheet, and the grains and patterns are deformed after the sheet is stretched, thus it is difficult to meet the design requirements. Furthermore, the sheet is first stretched into bubble shape when blistering, as shown in FIG. 1, the sheet is thick on both sides and thin in the middle. In the subsequent molding process, it is easy to appear as shown in FIG. 2 and FIG. 3, such as uneven thickness of the housing, the corners are too thin, etc., and the luggage therefore often fails the drop test.

SUMMARY OF THE DISCLOSURE

The present disclosure provides a negative mold for luggage molding, which aims to improve the existing problem that the appearance surface of the luggage is difficult to meet the design requirements and the uneven thickness of the luggage.

The following solutions are adopted.

A negative-mold blister mold for molding a luggage, including: an upper mold assembly, including an upper mold holder and a convex mold adapted and connected to the upper mold holder; wherein the upper mold holder is arranged with a first airflow channel passing through the convex mold, and the convex mold is capable of being driven by a drive member; a lower mold assembly, including a lower mold holder, a concave mold, and a lifting platform for driving the concave mold to move; and a material frame, arranged on the lower mold holder to clamp a sheet, such that the sheet is suspended above the lower mold holder; wherein the convex mold and the concave mold are configured to switch between an adsorbed state and a mold detaching state; in the adsorbed state, the upper mold holder abuts against the material frame to define an upper air cavity above the sheet, the upper air cavity being in communication with the first airflow channel; air is blown downward through the first airflow channel to stretch the sheet, while each of the convex mold and the concave mold moves in a direction close to the sheet to define a molding space, such that the stretched sheet fits the concave mold under a gas pressure of the first airflow channel and is evenly distributed along the molding space under a pressure of the convex mold; in the mold detaching state, each of the convex mold and the concave mold moves toward in another direction away from the material frame to detach the molded sheet.

In some embodiments, the concave mold includes a molding surface extending downward, and a pressing surface on the convex mold is set shape-similarly to the molding surface; the molding space is defined between the molding surface and the pressing surface in the adsorbed state.

In some embodiments, the molding surface includes a grainy part and/or a glossy part.

In some embodiments, the lower mold holder is arranged with a second airflow channel; in the adsorbed state, a lower air cavity in communication with the second airflow channel is defined between the concave mold and the sheet, and air is sucked downward through the second airflow channel; in the mold detaching state, air is blown upward through the second airflow channel.

In some embodiments, the first airflow channel is arranged along a middle of the convex mold.

In some embodiments, a plurality of waterways are arranged on the concave mold, and each waterway is laid out near a right angle of the concave mold.

A negative-mold blister molding method for a luggage, applied to the negative-mold blister mold as above and including:

when absorbing:

S1: fixing the sheet on the material frame, and moving the material frame to the lower mold holder after baking of the sheet is completed;

S2: driving the upper mold holder to abut against the material frame;

S3: blowing air downward through the first airflow channel to stretch the sheet into a bubble shape;

S4: continuing to blow air through the first airflow channel, driving, by the lifting platform, the concave mold to move up, and sucking air through the second airflow channel disposed in the lower mold holder; and S5: lowering the convex mold to define the molding space with the concave mold, and fitting the sheet to the concave mold and molding the sheet with an assistance of the convex mold;

when the mold is being detached:

S6: driving, by the upper mold holder, the convex mold to rise simultaneously; and S7: lowering the concave mold and blowing air upward through the second airflow channel to release the formed sheet from the concave mold.

In some embodiments, when absorbing, the air in the first airflow channel diffuses outwardly and downwardly from a middle of the convex mold.

In some embodiments, an insert is placed on the concave mold before the absorbing, such that the insert is integrally molded with the sheet in the molding space.

A negative-mold blister molding method for a luggage, applied to the negative-mold blister mold as above and including:

when absorbing:

S1: placing an insert on the concave mold;

S2: fixing the sheet on the material frame, and moving the material frame to the lower mold holder after baking of the sheet is completed;

S3: driving the upper mold holder to abut against the material frame;

S4: blowing air downward through the first airflow channel to stretch the sheet into a bubble shape; and S5: continuing to blow air through the first airflow channel, driving, by the lifting platform, the concave mold to move up, and sucking air through the second airflow channel disposed in the lower mold holder, such that the insert on the concave mold is molded integrally with the sheet;

when the mold is being detached:

S6: lowering the concave mold and blowing air upward through the second airflow channel to release the formed sheet from the concave mold.

By virtue of the above technical solutions, the present disclosure can achieve the following technical effects.

1. The sheet is molded by adsorption on the concave mold, which makes the appearance surface of the luggage housing fit the concave mold to ensure that the lines, grains, angles, etc. of the appearance surface meet the design requirements. By providing the convex mold on the upper mold holder, the convex mold is used to cooperate with the concave mold to define the molding space for sheet molding. During the molding state, a side of the sheet is attached to the concave mold and the other side is pressed by the convex mold, such that it is evenly distributed in the molding space, which makes the thickness of the luggage uniform, guarantees the strength of the luggage, reduces decorations such as corner guards, reduces the cost, and improve the market competition rate.

2. Most of the existing luggage blister molds are positive molds, when the sheet is required to be arranged with grain, and the sheet will be deformed to different degrees by stretching the grain, and it is also impossible to form local glossy surface or matte surface. In the present disclosure, the molding surface of the concave mold is provided with a grainy part and/or a glossy part, for example, a flat part of the molding surface is provided with a grain, and the raised or depressed part is provided with a shiny part or vice versa, without any specific limitation, so as to achieve partial graininess or shininess. By forming the grain on the molding surface of the concave mold, it can be guaranteed that the grain will not be deformed by the stretching of the sheet, ensuring a clear and beautiful grain.

3. An insert may be placed on the concave mold before adsorption, such that the insert is integrally molded with the sheet in the molding space, thereby reducing assembly. The insert may be a tie rod holder. When molding an upper housing of the luggage, the tie rod holder may not be placed, and when molding a lower housing of the luggage, the tie rod holder may be placed at a tie rod holder position, such that the insert and the lower housing are integrally molded, thereby realizing that the upper housing and the lower housing share the same mold. In addition, the tie rod holder and the lower housing are integrally molded, which can avoid the tie rod holder from exceeding the surface of the lower housing, and improve integrity of the whole luggage assembly and the surface quality of the whole luggage.

BRIEF DESCRIPTION OF THE DRAWINGS

In order to more clearly illustrate the technical solution of the embodiments of the present disclosure, the following is a brief description of the accompanying drawings to be used in the embodiments. It should be understood that the following accompanying drawings show only certain embodiments of the present disclosure and therefore should not be regarded as limiting the scope, and that other relevant accompanying drawings may be obtained by those skilled in the art without creative effort.

Figure 1:
FIG. 1 is a structural schematic view of a sheet when it is stretched.
Figure 2:
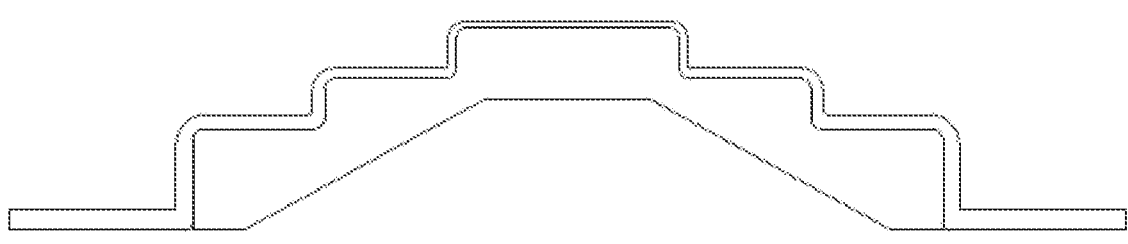
FIG. 2 is a structural schematic view of a stretched sheet being molded on a positive mold.
Figure 3:
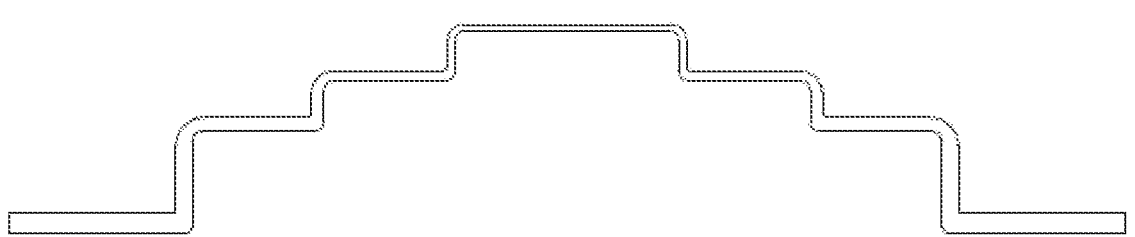
FIG. 3 is a sheet after being molded in FIG. 2.

Reference numerals: 11—upper mold holder; 111—first airflow channel; 112—upper air cavity; 113—receiving plate;

12—convex mold;

21—lower mold holder; 211—second airflow channel; 212—lower air cavity;

22—concave mold; 221—waterway;

23—lifting platform;

31—material frame;

41—sheet; 411—glossy surface; 412—matte surface;

51—insert;

61—housing; 611—tie rod holder position; 612—placement slot.

DETAILED DESCRIPTION

In order to make the purpose, technical solutions and advantages of the embodiments of the present disclosure clearer, the technical solutions in the embodiments of the present disclosure will be described clearly and completely below in conjunction with the accompanying drawings in the embodiments of the present disclosure, and it is clear that the embodiments described are a part of the embodiments of the present disclosure, and not all of them. Based on the embodiments in the present disclosure, all other embodiments obtained by those skilled in the art without making creative labor fall within the scope of the present disclosure. Accordingly, the following detailed description of the embodiments of the present disclosure provided in the accompanying drawings is not intended to limit the scope of the present disclosure claimed for protection, but merely to indicate selected embodiments of the present disclosure. Based on the embodiments in the present disclosure, all other embodiments obtained without creative labor by those skilled in the art fall within the scope of the present disclosure.

Embodiments

Figure 4:
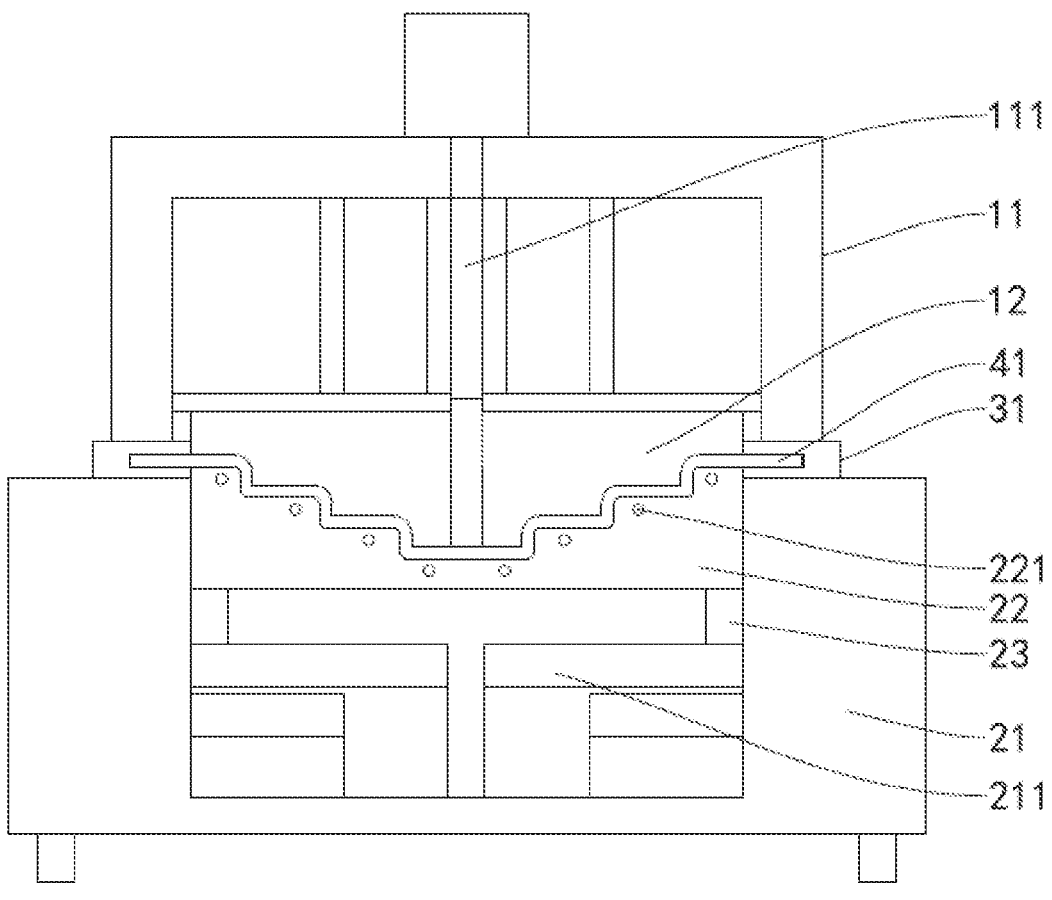
FIG. 4 is a structural schematic view of an embodiment of the present disclosure in an adsorbed state.
Figure 5:
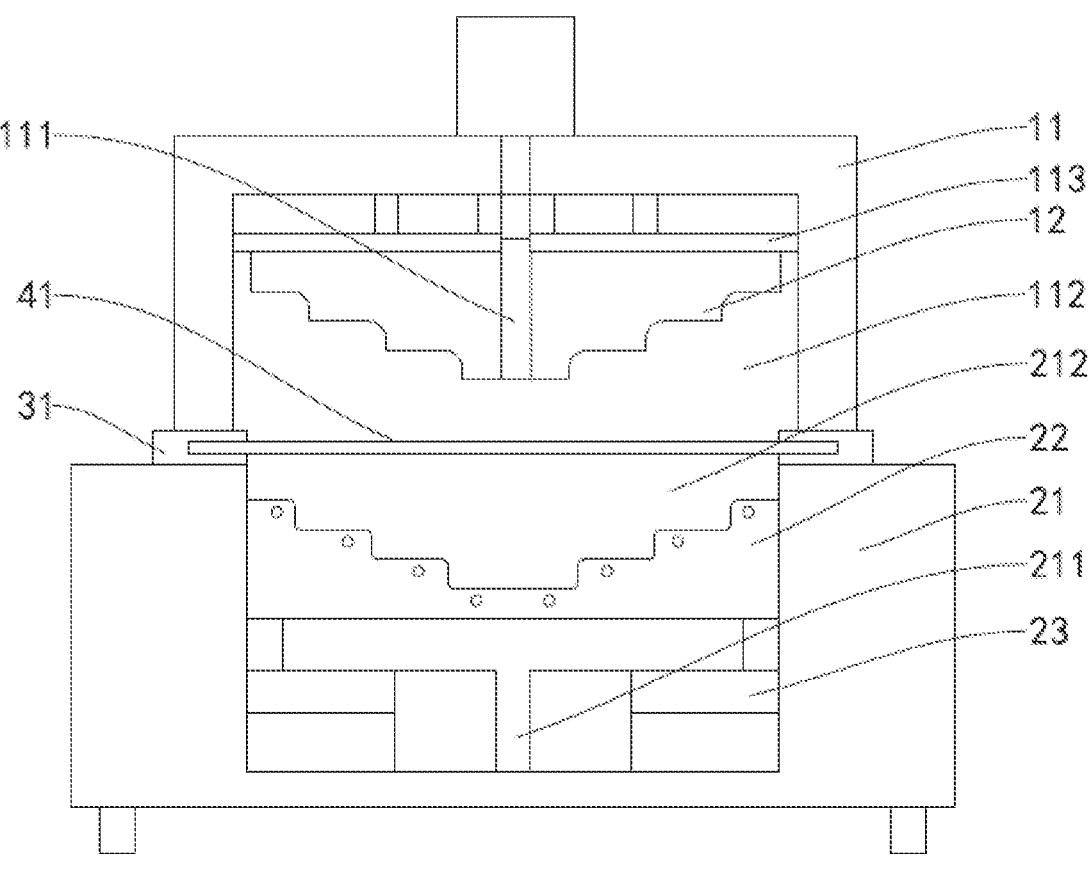
FIG. 5 is a structural schematic view of an embodiment of the present disclosure with an upper mold holder abutting against a material frame.
Figure 6:
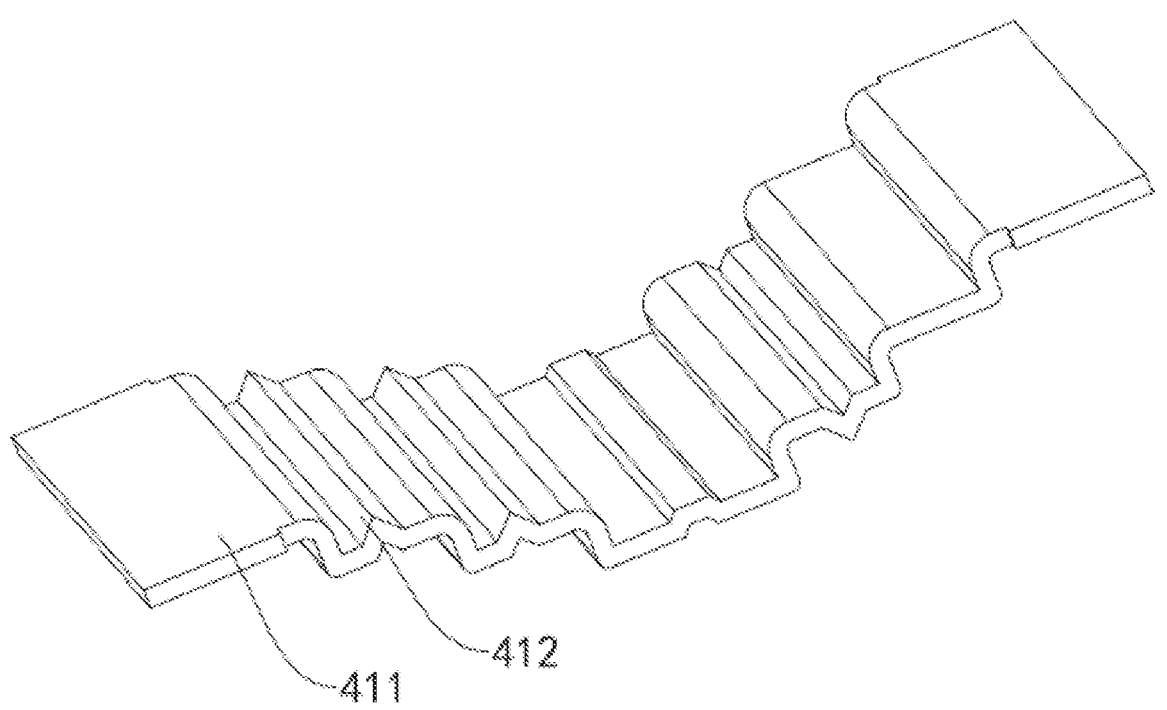
FIG. 6 is a structural schematic view of a molded sheet according to an embodiment of the present disclosure.

In combination with FIGS. 4 to 6, the present embodiments provide a negative mold for molding a luggage, including an upper mold assembly, a lower mold assembly, and a material frame 31. The upper mold assembly includes an upper mold holder 11 and a convex mold 12 adapted and connected to the upper mold holder 11, the upper mold holder 11 is arranged with a first airflow channel 111 passing through the convex mold 12, and the convex mold 12 is capable of being driven by a drive member configured on the upper mold holder 11. The lower mold assembly includes a lower mold holder 21, a concave mold 22, and a lifting platform 23 for driving the concave mold 22; the material frame 31 is arranged on the lower mold holder 21 to clamp a sheet 41 such that the sheet 41 is suspended above the lower mold holder 21; the convex mold 12 and the concave mold 22 are configured to switch between an adsorbed state and a mold detaching state; when in the adsorbed state, the upper mold holder 11 abuts against the material frame 31 to define an upper air cavity 112 above the sheet 41, the upper air cavity 112 being in communication with the first airflow channel 111, in which case air is blown downward through the first airflow channel 111 to stretch the sheet 41, while the convex mold 12 and the concave mold 22 move in the direction close to the sheet 41 to define a molding space, such that the stretched sheet 41 fits the concave mold 22 under a gas pressure of the first airflow channel 111, and is evenly distributed along the molding space under a pressure of the convex mold 12; when in the mold detaching state, each of the convex mold 12 and the concave mold 22 moves toward a position away from the material frame 31 to detach the molded sheet 41.

It should be noted that, in the embodiments, by arranging the convex mold 12 on the upper mold holder 11, the convex mold 12 is configured to cooperate with the concave mold 22 to define the molding space for the sheet 41 to be molded. During the molding state, a side of the sheet 41 is attached to the concave mold 22 and the other side is pressed by the convex mold 12, such that it is evenly distributed in the molding space, which makes the thickness of the luggage uniform, guarantees the strength of the luggage, reduces decorations such as corner guards, reduces the cost, and improve the market competition rate.

Specifically, the concave mold 22 includes a molding surface extending downward, and a pressing surface on the convex mold 12 is set shape-similarly to the molding surface. The molding space is defined between the molding surface and the pressing surface in the adsorbed state. In some embodiments, the molding surface includes a grainy part and/or a glossy part; for example, a flat part of the molding surface is set to be grainy and a raised or depressed part is set to be glossy for forming a matte surface 412 and a shiny surface 411; or conversely, the raised or depressed part is set to be grainy and the flat part is set to be glossy, without specific limitation, so as to achieve partial graininess or shininess. In addition, most of the existing luggage blister molds are positive molds; when a grain is to be formed, it is necessary to set the grain on the sheet, and the grain will be deformed to different degrees when the sheet is stretched, and it is impossible to form a partial glossy surface or matte surface. In the embodiments, by setting the grain on the molding surface of the concave mold 22, it may be ensured that the grain will not be deformed by the stretching of the sheet 41 and the grain will be clear and beautiful.

Based on the above embodiments, in some embodiments of the present disclosure, the lower mold holder 21 is arranged with a second airflow channel 211. When in the adsorbed state, a lower air cavity 212 in communication with the second airflow channel 211 is defined between the concave mold 22 and the sheet 41, in which case air is sucked downward through the second airflow channel 211; when in the mold detaching state, air is blown upward through the second airflow channel 211. Both sides of the concave mold 22 and the lower mold holder 21 are fitted and limited in position to ensure that the concave mold 22 will not be shifted in the process of moving. It should be noted that in the embodiments, the first airflow channel 111 is connected to an upper air valve, specifically, the upper air valve may be connected to an air inlet on the convex mold 12 through a hose or spring tube; and the second airflow channel 211 is connected to a lower air valve. The control principle about the air valve is prior art, and it will not be repeated herein. The second airflow channel 211 assists in mold detaching or adsorption such that the sheet 41 may be evenly stressed and better fit to the concave mold 22 during the molding process.

In some embodiments, the drive member may be a cylinder, and the convex mold 12 is fixedly connected to a receiving plate 113 on the upper mold holder 11; the receiving plate 113 is driven by the cylinder to drive the convex mold 12 up or down, without specific limitation herein. In other embodiments, the drive member performs the driving function through other structures. In some embodiments, the first airflow channel 111 is arranged along the middle of the convex mold 12, which may be composed of multiple small air holes to avoid the impact of too large holes on the sheet 41 molding. Since the luggage is generally large in size, several waterways 221 may be arranged on the concave mold 22, and each waterway 221 is laid out near a right angle of the concave mold 22, such that the molded sheet 41 can be cooled quickly to speed up the production efficiency.

A negative-mold blister molding method for a luggage is further provided, applied to the negative mold as described above. The method includes the following operations.

When absorbing:

S1: fixing the sheet 41 on the material frame 31 and suspending the sheet 41 above the lower mold holder 21, and moving the material frame 31 to the lower mold holder 21 after baking of the sheet 41 is completed.

S2: heating the sheet 41 and driving the upper mold holder 11 to abut against the material frame 31 to define the upper air cavity 112 above the upper mold holder 11 and the sheet 41.

S3: blowing air downward through the first airflow channel 111 to stretch the sheet 41 into a bubble shape.

S4: continuing to blow air through the first airflow channel 111, driving, by the lifting platform 23, the concave mold 22 to move up, while sucking air through the second airflow channel 211 disposed in the lower mold holder 21, and pressurizing the sheet 41 on both sides to ensure a balanced force.

S5: lowering the convex mold 12 to define the molding space with the concave mold 22, and fitting the sheet 41 to the concave mold 22 and molding the sheet 41 with the assistance of the convex mold 12;

When the mold is being detached:

S6: driving, by the upper mold holder 11, the convex mold 12 to rise simultaneously.

S7: lowering the concave mold 22 and blowing air upward through the second airflow channel 211 to release the formed sheet 41 from the concave mold 22.

It should be mentioned that during the adsorption, the air in the first airflow channel 111 diffuses outwardly and downwardly from the middle of the convex mold 12 to further guarantee the uniform force on the sheet 41.

Figure 7:
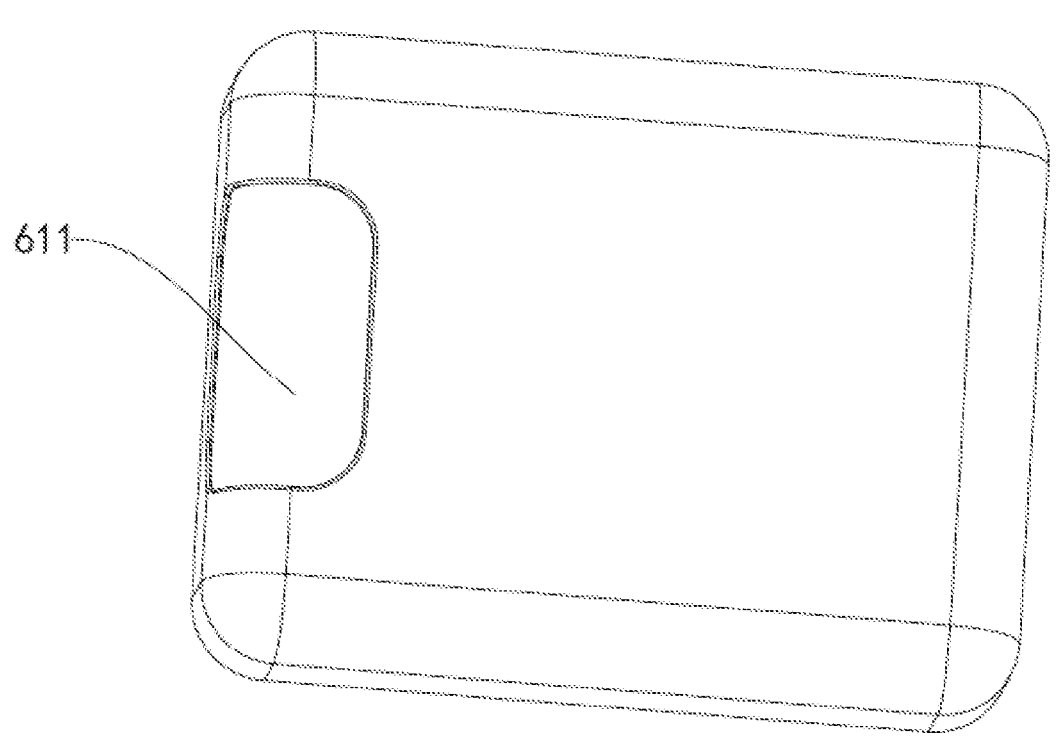
FIGS. 7 to 9 are structural schematic views of a housing.
Figure 8:
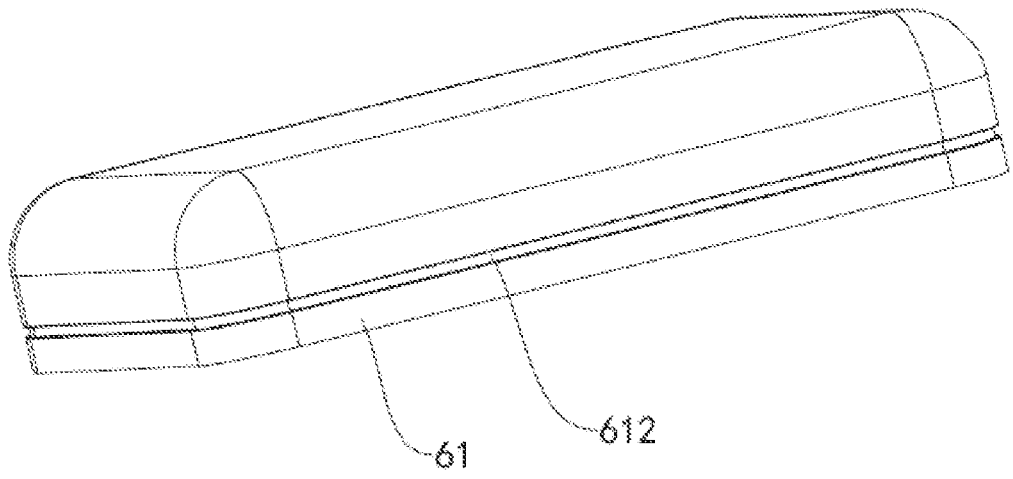
Figure 9:
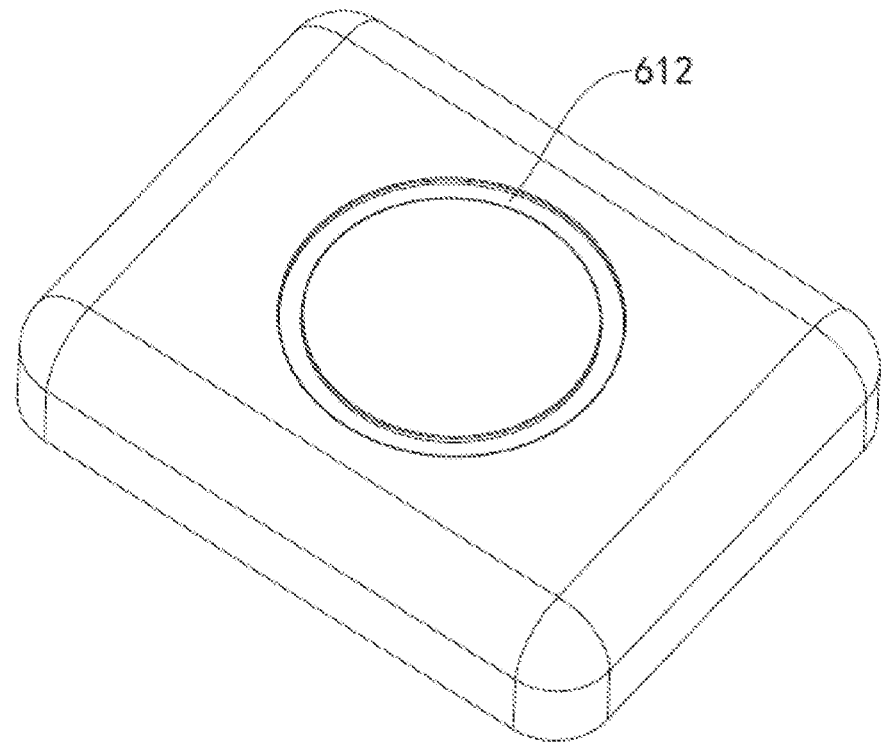
Figure 10:
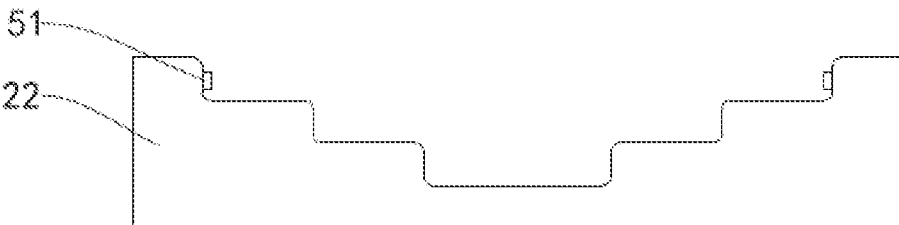
FIG. 10 is a structural schematic view of an embodiment of the present disclosure with an insert placed on a concave mold.

In some embodiments, an insert 51 may be placed on the concave mold 22 before adsorption, such that the insert 51 is integrally molded with the sheet 41 in the molding space, thereby reducing assembly. The insert 51 may be a tie rod holder. Combined with FIG. 7, when molding an upper housing of the luggage, the tie rod holder may not be placed, and when molding a lower housing of the luggage, the tie rod holder may be placed at a tie rod holder position 611, such that the insert 51 and the lower housing are integrally molded, thereby realizing that the upper housing and the lower housing share the same mold. In addition, the tie rod holder and the lower housing are integrally molded, which can avoid the tie rod holder from exceeding the surface of the lower housing 61 and improve the surface quality. The insert 51 may also be a decorative ring, decorative strip, etc. Combined with FIGS. 8 and 9, in the existing housing 61 molding, when additional decorative parts are needed on the housing 61, a placement slot 612 is required to be machined on the housing 61 by later machining. While in the embodiments, combined with FIG. 10, the required decorative parts are only required to be placed on the molding surface of the concave mold 22 to be integrally molded with the sheet 41, thereby strengthening the housing 61 and beautifying the housing 61. In addition, the shape and position of the insert 51 are not fixed, allowing for a wider variety of appearance molding and improved versatility of the mold. In other embodiments, a metal foil may be placed on the concave mold 22 to achieve a hot stamping effect. A foil with a pattern may be placed on the concave mold 22 to achieve precise positioning of the pattern to be adsorbed onto the housing surface. In the existing housing blister molding, the pattern is printed on the surface of the sheet, and when the sheet is stretched and deformed, the printed pattern is deformed significantly. In the embodiments, the film pattern may be placed directly on the molding surface of the concave mold, and the film pattern is not stretched by adsorption, thereby ensuring that the pattern will not produce stretching deformation.

Another negative-mold blister molding method for a luggage is provided, including the following operations.

When absorbing:

S1: placing the insert 51 on the concave mold 22.

S2: fixing the sheet 41 on the material frame 31 and suspending the sheet 41 above the lower mold holder 21, and moving the material frame 31 to the lower mold holder 21 after baking of the sheet 41 is completed.

S3: driving the upper mold holder 11 to abut against the material frame 31 to define the upper air cavity 112 above the upper mold holder 11 and the sheet 41.

S4: blowing air downward through the first airflow channel 111 to stretch the sheet 41 into a bubble shape.

S5: continuing to blow air through the first airflow channel 111, driving, by the lifting platform 23, the concave mold 22 to move up, while sucking air through the second airflow channel 211 disposed in the lower mold holder 21, and pressurizing the sheet 41 on both sides to ensure a balanced force, such that the insert 51 on the concave mold 22 is molded integrally with the sheet 41.

When the mold is being detached:

S6: lowering the concave mold 22 and blowing air upward through the second airflow channel 211 to release the formed sheet 41 from the concave mold 22.

It should be noted that in the embodiments, the convex mold 12 may be controlled not to descend, and the convex mold 12 may be removed if necessary to facilitate the pick and place of the insert 51, as well as to avoid interference with the convex mold 12 when the thickness of the insert 51 is too large. The present disclosure makes no limitation in this regard.

The above is only some embodiments of the present disclosure, and the scope of the present disclosure is not limited to the above embodiments, and all technical solutions belonging to the ideas of the present disclosure belong to the scope of the present disclosure.

What is claimed is:

1. A negative-mold blister mold system for molding a luggage, comprising:

an upper mold assembly, comprising an upper mold holder and a convex mold adapted and connected to the upper mold holder; wherein the upper mold holder is arranged with a first airflow channel passing through the convex mold, and the convex mold is capable of being driven by a drive member;

a lower mold assembly, comprising a lower mold holder, a concave mold, and a lifting platform for driving the concave mold to move; and a material frame, arranged on the lower mold holder to clamp a sheet, such that the sheet is suspended above the lower mold holder;

wherein the convex mold and the concave mold are configured to switch between an adsorbed state and a mold detaching state;

in the adsorbed state, the upper mold holder abuts against the material frame to define an upper air cavity above the sheet, the upper air cavity being in communication with the first airflow channel; air is blown downward through the first airflow channel to form a positive pressure in the upper air cavity, such that the sheet is stretched, while each of the convex mold and the concave mold moves in a direction close to the sheet to define a molding space, such that the stretched sheet fits the concave mold under a gas pressure of the first airflow channel and is evenly distributed along the molding space under a pressure of the convex mold;

in the mold detaching state, each of the convex mold and the concave mold moves toward in another direction away from the material frame to detach the molded sheet.

2. The negative-mold blister mold system according to claim 1, wherein the concave mold comprises a molding surface extending downward, and a pressing surface on the convex mold is set shape-similarly to the molding surface; the molding space is defined between the molding surface and the pressing surface in the adsorbed state.

3. The negative-mold blister mold system according to claim 2, wherein the molding surface comprises a grainy part and/or a glossy part.

4. The negative-mold blister mold system according to claim 1, wherein the lower mold holder is arranged with a second airflow channel; in the adsorbed state, the lower mold holder abuts against the material frame to define an lower air cavity under the sheet, the lower air cavity is in communication with the second airflow channel, and air is sucked downward through the second airflow channel to form a negative pressure in the lower air cavity; in the mold detaching state, air is blown upward through the second airflow channel.

5. The negative-mold blister mold system according to claim 1, wherein the first airflow channel is arranged along a middle of the convex mold.

6. The negative-mold blister mold system according to claim 1, wherein a plurality of waterways are arranged on the concave mold, and each waterway is laid out near a right angle of the concave mold.

* * * * *